United States Patent
Hosick et al.

[11] Patent Number: 6,032,904
[45] Date of Patent: Mar. 7, 2000

[54] MULTIPLE USAGE THRUSTER MOUNTING CONFIGURATION

[75] Inventors: Daryl K. Hosick, Santa Cruz; Walter S. Gelon, Redwood City; Richard M. Mills, San Jose, all of Calif.

[73] Assignee: Space Systems/Loral, Inc., Palo Alto, Calif.

[21] Appl. No.: 09/027,668

[22] Filed: Feb. 23, 1998

[51] Int. Cl.⁷ .................................................. B64G 1/26
[52] U.S. Cl. ............................................................ 244/169
[58] Field of Search .................................... 244/164, 169, 244/172

[56] References Cited

U.S. PATENT DOCUMENTS

| | | |
|---|---|---|
| 4,767,084 | 8/1988 | Chan et al. . |
| 5,020,746 | 6/1991 | Anzel . |
| 5,312,073 | 5/1994 | Flament et al. ......................... 244/169 |
| 5,349,532 | 9/1994 | Tilley et al. ............................ 244/164 |
| 5,383,631 | 1/1995 | Mazzini .................................. 244/169 |

*Primary Examiner*—Peter M. Poon
*Assistant Examiner*—Charles R. Ducker, Jr.
*Attorney, Agent, or Firm*—Perman & Green, LLP

[57] ABSTRACT

A three-axis stabilized spacecraft having roll, pitch, and yaw axes and when on station in orbit about the earth having a north face and a south face is equipped with a first and second thruster which may be electric thrusters. A first support device mounts the first thruster adjacent the north face and the first thruster is positioned a spaced distance away from the north face in a first direction parallel to the pitch axis and spaced from the pitch axis in a second direction normal to the pitch axis. A second support device mounts the second thruster adjacent the south face, the second thruster being positioned a spaced distance away from the south face in a third direction opposite the first direction and spaced from the pitch axis in the second direction. A gimbal mechanism pivotally mounts the first and second thrusters on the first and second support devices, respectively, for selectively positioning the attitude of the first and second thrusters. The spacecraft includes a system for performing one or more operations including the following: thrusting along the yaw axis to assist in reaching a geosynchronous orbit; reducing the stored angular momentum of the momentum wheels; and north-south station keeping of the spacecraft.

26 Claims, 10 Drawing Sheets

BIPROP ORBIT RAISING

ELECTRIC ORBIT RAISING

MULTIPLE USAGE THRUSTER MOUNTING CONFIGURATION

BACKGROUND OF THE INVENTION

1. Field of the Invention

The present invention relates generally to an in-space thruster system and, more particularly, to a system utilizing a pair of electric thrusters which co-operate for orbit raising, for north-south station keeping when the desired orbit is achieved, and for selectively unloading momentum wheels used for controlling the orientation of the spacecraft.

2. Description of the Prior Art

Satellites or spacecraft orbiting the earth are useful for many applications including weather data collection and communications. As these applications have become more complex, they have resulted in a demand for more powerful payloads and hence more massive spacecraft. However, heavier spacecraft are increasingly more difficult and expensive to place, and then maintain, on orbit.

A typical spacecraft is placed on orbit by a combination of a launch vehicle and its own propulsion systems. A launch vehicle will propel and release the spacecraft in an initial lower orbit about the earth; once in this initial lower orbit the spacecraft propulsion system will be responsible for propelling the spacecraft to its final orbit.

A launch vehicle will have a limited lift capability, beyond which, it will not be capable of delivering the spacecraft to an acceptable orbit. The lift limit is the maximum spacecraft separation mass, i.e., the sum of the spacecraft's fuel and dry mass. Generally, the more lift capability is required, the larger and more expensive is the launch vehicle. Thus as the mass of a spacecraft increases during the design process, the availability of the less capable, inexpensive launch vehicles decreases. There is a real desire to maintain compatibility with a broad range of less capable and inexpensive launch vehicles as spacecraft dry mass increases.

Clearly, if the dry mass of a spacecraft increases, then its fuel mass must decrease to remain compatible with inexpensive launch vehicles. The fuel mass can decrease if the propulsion subsystem becomes more efficient. At the present, liquid chemical thrusters are the propulsion means of choice on most spacecraft for propelling the spacecraft during its transfer orbit to final on-station orbit, a process referred to herein as orbit raising. The mass of the chemical propellant needed for this maneuver can be as much as half of the separated mass. Dry mass could be increased by, say, 50% if the need for half of this fuel could be eliminated. Another inefficiency associated with prior art orbit raising is that to achieve a high efficient large chemical thrust, a dedicated main satellite thruster (MST) is required. This thruster is too powerful to be used for the delicate maneuvers required on orbit. Clearly, there is need for a more efficient propulsion system using less fuel mass during orbit raising.

Once on station the propulsion system is responsible for maintaining the orbit throughout the life of the mission. Commonly, spacecraft orbit the earth at the same revolution rate as the earth spins. These spacecraft and corresponding orbits are referred to as "synchronous" or "geosynchronous". When the synchronous orbit lies in the plane of the earth's equator, the synchronous spacecraft is also called geostationary and operates within a "stationary" orbit. It is generally well known in the art that various forces act on synchronous spacecraft which move the spacecraft out of a desired orbit. These forces are due to several sources including the gravitational effects of the sun and moon, the elliptical shape of the earth, and solar radiation pressure. To counter these forces, synchronous spacecraft are equipped with propulsion systems that are fired at intervals in order to maintain station at a desired geostationary and longitudinal location. This maintenance requires control of the inclination, eccentricity, and drift of the spacecraft. The orbit's inclination defines the north-south position of the spacecraft relative to the earth's equator. Eccentricity is the measure of the noncircularity of the spacecraft orbit. That is, the measure of the variation of the distance the spacecraft is from the center of the earth as the spacecraft moves around its orbit. Drift is the measure of the difference in longitude of the spacecraft's subsatellite point and the desired geostationary longitude as time progresses.

Current three-axis stabilized spacecraft use liquid chemical propulsion for station keeping. Typically, one set of thrusters are used for controlling the inclination while a second set is used for controlling the drift and eccentricity. Of these maneuvers, controlling inclination, commonly referred to as north-south station keeping, requires the most fuel. A spacecraft with a dry mass of 2000 kg will require over 400 kg of liquid propellant on-station for a 12 year mission. Additional fuel is also consumed by the MST just to place this 400 kg of fuel on orbit. Clearly, there is need for a more efficient use of fuel during north-south station keeping maneuvers.

Once on-station, a spacecraft must maintain its attitude in addition to its orbital position. This orbital maintenance is essential for geosynchronous communications spacecraft in which communication hardware must be pointed to a preselected planetary location. Disturbance torques, such as solar pressure, work to produce undesired spacecraft attitude motion. Momentum wheel stabilization systems are commonly used to counteract such disturbance torques. Such systems typically include one or more momentum wheels and control loops to sense and control changes in the spacecraft attitude. Sensors on the spacecraft may detect yaw, pitch and roll. The control loops determine the required speed of the wheels to absorb or off-load momentum based on the sensed attitude. Momentum stored in the momentum wheels must be periodically relieved, desaturated, or unloaded, to keep the momentum wheels within a finite operable speed range. Desaturation is typically accomplished by applying an external torque to the spacecraft through propulsion thrusting. This requires more fuel and more thrusters. An efficient propulsion system would maximize the efficient use of the fuel and minimize the number of thrusters needed for these maneuvers.

In summary, the prior art geosynchronous satellite may have a dozen or more small liquid chemical thrusters and a large MST and will require more mass in fuel than mass in payload and supporting structure. Recent developments in the art have been directed toward reducing this proportion of fuel mass. One significant development is the electric thruster. In one type of electric thruster, a plasma thruster, xenon atoms are ionized in collisions with electrons creating xenon ions. Thrust is created as the charged xenon ions are accelerated out of the thruster by an electric-magnetic field. Although there is an initial weight penalty for the electric o propulsion system hardware, the specific impulse (The measure of thruster efficency) of electric thrusters is substantially higher than chemical systems and can lead to a net savings in propulsion system mass. The higher specific impulse of the electric thruster (approximately 1500–3000 seconds compared to 300 seconds for chemical thrusters) corresponds to a larger change in spacecraft velocity or momentum per unit of consumed fuel. Thus less propulsion system mass is needed for a given spacecraft dry mass.

The thrust of the MST is several hundred Newtons and its total orbit raising impulse can be delivered in a few hours. The electric thruster could potentially reduce the fuel mass needed during orbit raising. However, the thrust of an electric thruster is very small, measured in mili-Newtons and its total impulse takes many days to deliver. Hence orbit raising purely with electric thrusters would require many thrusters, take a long time and expose the spacecraft to the Van Allen radiation belts for long periods of time damaging the solar arrays. Further one skilled in the art would have a difficult time determining electric thruster mounting locations on the spacecraft which would be useful for electric orbit raising and would at a later time be in a useable position for on-station maneuvers. What is needed is an electric thruster system that can supplement the chemical system during orbit raising to get to orbit in a timely fashion yet show a substantial fuel mass savings and still be useful on station.

For north-south station keeping, it is desirable to orient thrusters along the north-south axes of the spacecraft. However, there are several obstacles to orienting the chemical or electric thrusters along the north-south axes. Because the location of the solar arrays along or near the north-south axis, a thruster must be offset from the north-south axis to avoid plume contamination of the arrays. If the offset thruster is placed with zero cant, its thrust will not extend through the spacecraft center of mass; this would produce a torque inducing a spacecraft rotation. To combat this torque, an additional thruster is needed (this is in fact done in chemical thruster station keeping). Thus a minimum of four chemical thrusters are used in the prior art providing both north and south thrust. FIG. 1A shows prior art locations of four chemical thrusters 2 on a spacecraft 4 with solar arrays 6 aligned along the north-south direction. These are typical locations for north and south thrusting thrusters. FIG. 1A also shows a plurality of other thrusters 7 used for other maneuvers. A second problem with placing thrusters with zero cant along the north and south directions is that thruster plume impinges on the solar array panel degrading array performance as well as producing spacecraft torque disturbances. This is especially a problem with electric thrusters which have wide plumes. Further, the electric thruster plume can interfere with RF communication and should not be mounted near the nadir (earth facing) deck 8 which contains RF communication hardware (antennas) 10.

The prior art does show on-station use of electric thrusters. This configuration removes the need for the four chemical thrusters 2 shown in FIG. 1A. U.S. Pat. No. 5,020,745 issued Jun. 4, 1991 to Anzel describes an electric thruster arrangement and its use for north-south station keeping of a three-axis stabilized spacecraft although it does not indicate whether it has any utility for orbit raising or unloading momentum. The arrangement makes use of two thrusters as illustrated in FIG. 1B. The thrusters are mounted on the anti-nadir face 48 of the satellite. A single north thruster 12 is canted at an angle θ from the north-south axis of the satellite providing thrust in a southerly direction and a single south thruster 14 is canted at the angle θ from the north-south axis providing thrust in a northerly direction. The cant angles are chosen such that the thrusters' thrust vectors are directed through the center of mass 16 of the spacecraft so that their thrust does not provide an attitude disturbance torque. Thus each thruster provides thrust with a component along the desirable north-south direction and a component in an undesirable radial direction. By splitting the station keeping maneuver into two burns, a north thruster burn followed twelve hours later by a south thruster burn, the effects of the undesirable radial components of thrust cancel and the net effect is a desirable station keeping maneuver. However, since the thrusters are continually directed toward the center of mass, Anzel's invention cannot purposely produce disturbance torques to unload momentum wheels or otherwise adjust spacecraft attitude.

In addition, Anzel's placement of the thrusters on the anti-nadir face 48 results in very large cant angles θ. This means that a great portion of thrust is in the radial direction and not along the north-south axis. This corresponds to wasted fuel and increased spacecraft separation mass. The fuel efficiency for north-south station keeping is reduced by the cosine of the cant angle θ between the thrust vector and north-south axis; the following is an example of extra fuel usage versus angle, assuming a typical total of 107 kg of fuel for electric north-south station keeping with no cant angle:

| Angle (degrees) | % Additional Fuel Usage | Delta Mass (kg) |
|---|---|---|
| 0 | 0 | 0 |
| 30 | 15.5 | 16.6 |
| 35 | 22 | 23.5 |
| 40 | 30.5 | 32.64 |
| 45 | 41.4 | 44.3 |
| 50 | 55.6 | 59.5 |
| 55 | 74.3 | 79.5 |
| 60 | 100 | 107 |

Therefore large cant angles can nearly double the amount of required station keeping fuel. In addition to extra mass, this also means that the time of a given maneuver increases causing unnecessary wear on the thrusters. This extra thruster usage is highly undesirable and a fundamental problem with the partial solution of Anzel.

U.S. Pat. No. 5,349,532 issued Sep. 20, 1994 to Tilley et al. discloses a technique for enhancing efficiency and reliability over then-known techniques by simultaneously stabilizing attitude dynamics and desaturating the momentum wheel system of the spacecraft while performing north-south station keeping maneuvers. In order to achieve these results the spacecraft position attitude and stored wheel momentum are sensed. The forces necessary to perform station keeping maneuvers, the torques required to produce the desired attitude for the spacecraft, and desaturate the wheels are determined and ion thrusters are throttled and gimbaled to produce the desired torques on the spacecraft. However, the system relies on placing thrusters near the nadir or earth deck as well as the anti-earth deck which is not optimum with electric thrusters. Although the system has many advantages, potential remains for electric thruster plume impingement on the solar arrays and RF equipment near the earth-deck. Further this patent does not address orbit raising.

The prior art, therefore, is lacking a highly efficient electric propulsion system which uses the same thrusters for orbit raising as on-station station keeping, allows a spacecraft of substantial dry mass to be launched on less capable launch vehicles, allows for spacecraft separation mass to be over 50% dry mass, performs north-south station keeping with a small efficient cant angle, can unload momentum wheels, and avoids plume interference with solar array and RF communication hardware near the earth-facing side of the spacecraft.

It was with knowledge of the foregoing that the present invention was conceived and has now been reduced to practice.

SUMMARY OF THE INVENTION

A three-axis stabilized spacecraft having roll, pitch, and yaw axes and when on station in orbit about the earth having a north face and a south face is equipped with a first and second thruster which may be electric thrusters. A first support device mounts the first thruster adjacent the north face and the first thruster is positioned a spaced distance away from the north face in a first direction parallel to the pitch axis and spaced from the pitch axis in a second direction normal to the pitch axis. A second support device mounts the second thruster adjacent the south face, the second thruster being positioned a spaced distance away from the south face in a third direction opposite the first direction and spaced from the pitch axis in the second direction. A gimbal mechanism pivotally mounts the first and second thrusters on the first and second support devices, respectively, for selectively positioning the attitude of the first and second thrusters. The spacecraft includes a system for performing one or more operations including the following: thrusting along the yaw axis to assist in reaching a geosynchronous orbit; reducing the stored angular momentum of the momentum wheels; and north-south station keeping of the spacecraft.

OBJECTS AND ADVANTAGES

Accordingly, a primary object of the invention, is to provide an in-space thruster system utilizing a minimal number of thrusters for both orbit raising, and for north-south station keeping, and for selectively unloading momentum wheels used for controlling the orientation of the spacecraft. It is a further object to provide positioning of the thrusters within the system so that their cant angles for each specific task are minimized, providing highly efficient thrust. Another object is to position the thrusters such that their exhaust plumes do not impinge on the solar array nor interfere with RF communication equipment on the earth facing side of the spacecraft.

A major advantage of the invention is the significant reduction in fuel mass needed and subsequent availability of less expensive launch vehicles for a spacecraft utilizing this system when the thrusters are electric. Another advantage is that the position of the thrusters of this system is such that more area on the spacecraft surface is available for valuable payload.

Other and further features, advantages, and benefits of the invention will become apparent in the following description taken in conjunction with the following drawings. It is to be understood that the foregoing general description and the detailed description are exemplary and explanatory but are not to be restrictive of the invention. The accompanying drawings which are incorporated in and constitute a part of this invention, illustrate one of the embodiments of the invention in general terms. Like numerals refer to like parts throughout the disclosure.

DETAILED DESCRIPTION OF THE PREFERRED EMBODIMENTS

Figures 1A, 1B:
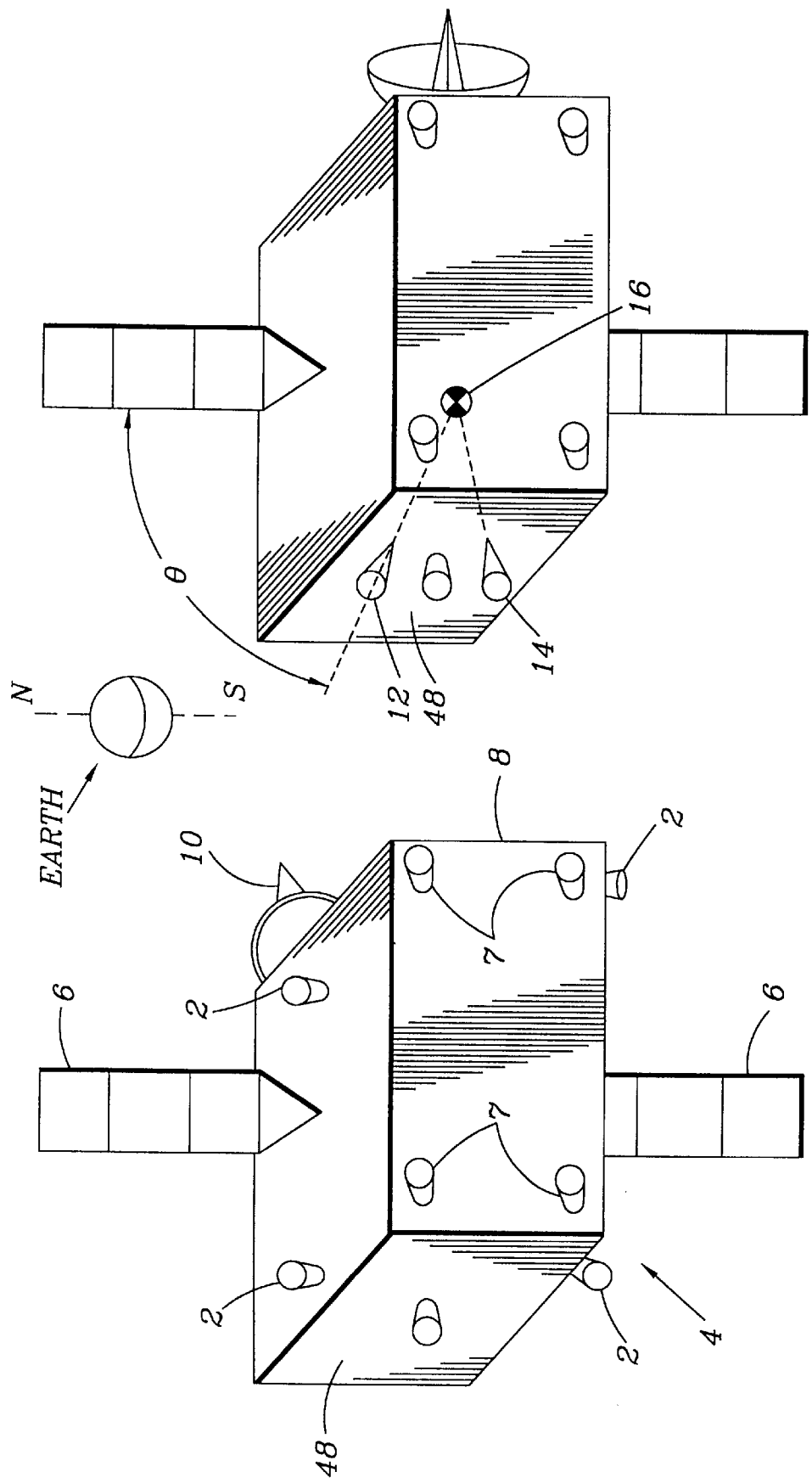
FIG. 1A is a prior art spacecraft with chemical thrusters used for north-south station keeping.
FIG. 1B is a prior art spacecraft with electric thrusters mounted on the anti-nadir or anti-earth face for north-south station keeping.
Figure 1C:
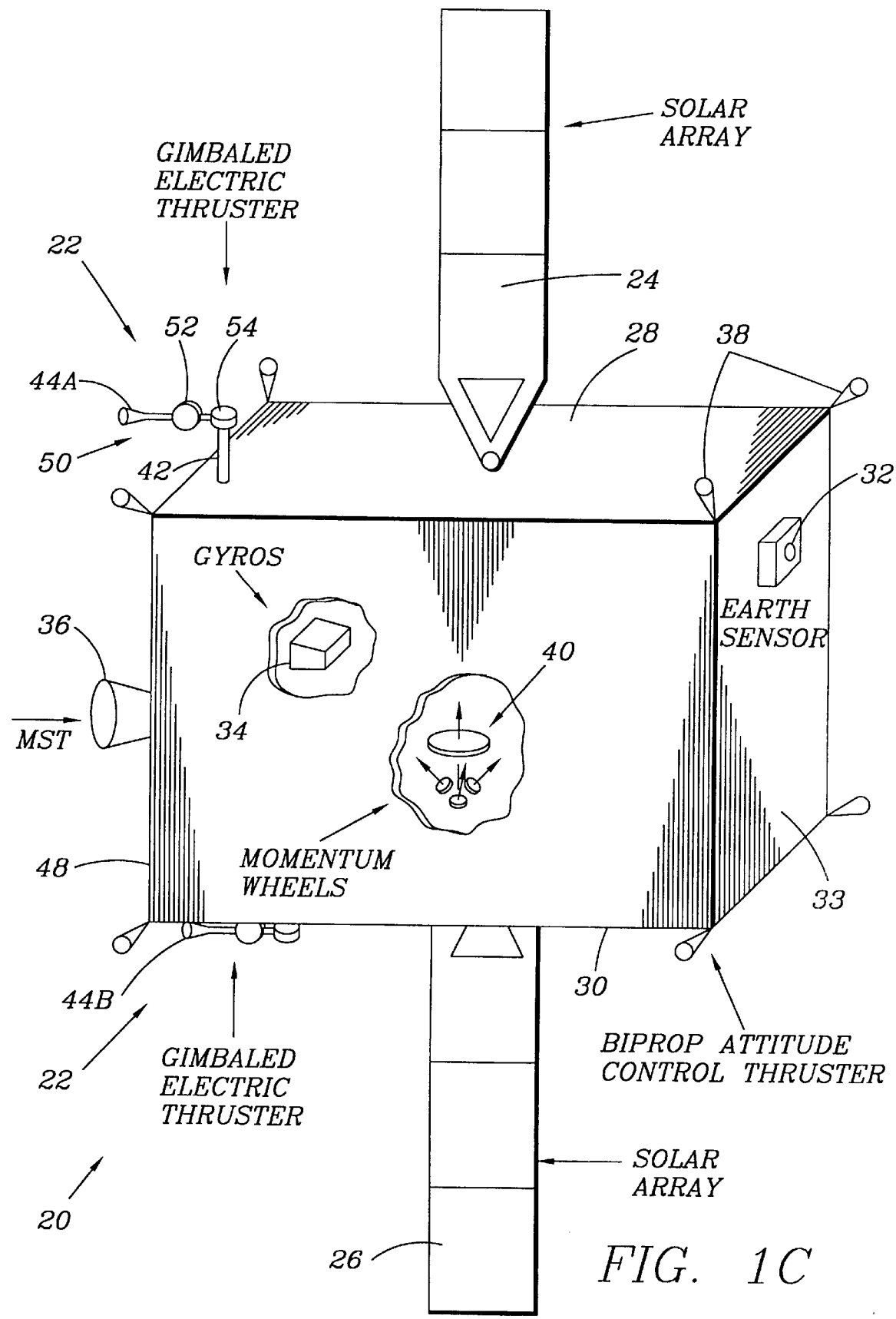
FIG. 1C is diagrammatic perspective view of a spacecraft embodying the present invention.

Turn to the drawings and, initially, to FIG. 1C which illustrates a spacecraft 20 equipped with gimbaled electric thruster devices 22 according to the invention. Thrusters 44A and 44B are preferably electric thrusters with high specific impulse (ISP); however, the invention clearly can be implemented with any suitable thruster type. A number of other features commonly found on a three-axis stabilized spacecraft are also illustrated. Solar arrays 24, 26 emanate from north and south faces 28, 30, respectively, of the spacecraft 20 and, in the customary fashion, convert sun energy into power. The spacecraft 20 also contains a suitable suite of sensors depicted diagrammatically and collectively by reference numeral 32 used to determine the spacecraft's attitude or orientation in space. The sensor suite 32 may include, for example, an earth sensor on an earth face 33 for two axis sensing (pitch and roll) relative to the earth and a set of gyroscopes 34 for inertial three-axis rate and attitude sensing. The spacecraft 20 may also be equipped with several sun sensors (not shown) and/or, more expensively, a star tracker (also not shown).

The spacecraft 20 of FIG. 1C is also equipped with a plurality of on board momentum wheels 40. As the attitude of the spacecraft is perturbed by external factors (such as solar torques on the solar arrays 24 26), the spacecraft 20 includes a suitable control mechanism to spin up and slow down the momentum wheels 40 in such a manner as to control the attitude of the spacecraft as desired. This is referred to in the art as "absorbing" or "storing" momentum. Further, the term "momentum wheel" is used in a generic sense to refer to wheels which spin in only one direction as well as wheels which spin in either direction (the latter commonly being called "reaction wheels"), or any other type of spinning wheel. Because of secular (that is, non-cyclical) perturbations, the speed of a momentum wheel or wheels eventually approaches an upper limit at which point it is said to be saturated. Commonly a thruster is fired to purposely produce a perturbation which is then corrected for by reducing the wheel speed to a lower and safer level. This operation is referred to as "momentum unloading". Again, to the extent than an electric thruster device may be used rather than a chemical thruster, fuel mass can be conserved. This invention provides means to control momentum wheel speeds both during electric orbit raising and during north-south station keeping using the electric thruster devices.

In addition to the electric thruster devices 22, the spacecraft 20 employs a plurality of other thrusters commonly of chemical nature. These thrusters are typically of higher thrust but less efficient than the electric thruster devices 22. In this regard, a main spacecraft thruster (MST) 36 is used primarily to boost the spacecraft quickly from launch vehicle on the ground to its orbit position. A major purpose of this invention is to make use of electric thruster devices 22 to perform part of the orbit raising. Electric thrusters have a specific impulse (the measure of thruster efficiency) much higher than chemical thrusters such as MST 36. Electric thrusters, therefore, require less fuel mass to produce the same change in spacecraft velocity.

The spacecraft 20 is also equipped with a plurality of smaller fixed chemical thrusters 38 commonly located near the spacecraft corners and edges. These thrusters are typically used to orient and steer the spacecraft 20 for MST burns during transfer orbit, and traditionally are also used on station for east-west station keeping and for unloading momentum stored in momentum wheels 40. North-south station keeping consumes the most propellant mass of the on-orbit maneuvers. It is therefore a primary objective of the invention to use efficient electric thruster devices 22 for north-south station keeping thereby further reducing the fuel mass required to be carried by the spacecraft 20 and eliminating the need to carry chemical thrusters for north/south station keeping. A secondary benefit of gimbaled electric thruster devices 22 is that it can be used to unload momentum stored in the momentum wheels 40 as described later.

Figure 2:
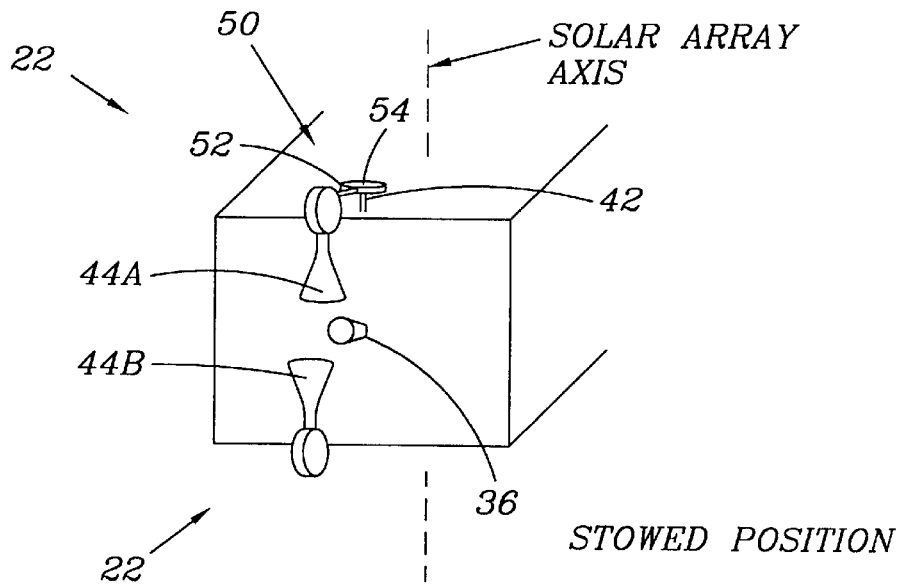
FIG. 2 is a diagrammatic perspective view of the spacecraft illustrated in FIG. 1C but from a different perspective and illustrating only some of the components illustrated in FIG. 1C and some of those components in a different orientation.

As seen in FIGS. 1C and 2, each of the electric thruster devices 22 comprises a support pylon 42 for mounting an associated thruster 44A, 44B adjacent an associated face or panel. Spacecraft 20 is a three-axis stabilized spacecraft with principal axes referred to as roll, pitch and yaw. When a spacecraft is in geostationary orbit the solar array or pitch axis is generally aligned with the north-south axis of the earth, the yaw axis is directed nominally towards the center of the earth, and the roll axis generally is directed east. In the drawings, as most clearly seen in FIG. 5, these coordinates are arbitrarily named the X-axis (or roll axis), the Y-axis (or pitch axis), and the Z-axis (or yaw axis) and their respective relationships with the earth 46 being indicated. Returning to FIG. 1C, one thruster 44A is mounted adjacent the north face 28 and a spaced distance away from the north face in a first direction parallel to the pitch (or Y-) axis and a spaced distance away from the pitch (or Y-) axis in a second direction normal to the pitch axis, that is, away from the earth face 33 and toward an anti-earth face 48. An opposing mating thruster 44B is mounted adjacent the south face 30 and a spaced distance away from the south face in a third direction opposite the first direction, and a spaced distance away from the pitch (or Y-) axis in the second direction normal to the pitch axis, that is, away from the earth face 33 and toward the anti-earth face 48.

A gimbal mechanism 50 pivotally mounts the first and second thrusters 44A, 44B, on the support pylons 42, respectively, for selectively positioning the pointing direction or attitude of the first and second thrusters 44A, 44B. Each gimbal mechanism 50 includes a first gimbal 52 for mounting each of the thrusters 44A, 44B for pivotal movement about an axis parallel to the roll, that is, X-axis and in a plane parallel to a plane defined by the pitch (that is, Y-axis) and yaw (that is, Z-axis) axes. Each gimbal mechanism 50 also includes a second gimbal 54 suitably connected to the first gimbal 52 for mounting the thrusters 44A, 44B for pivotal movement about an axis parallel to the pitch axis so as to have a component of thrust directed out of the plane defined by the pitch and yaw axes. Further, the first gimbal 52 mounts the thrusters 44A, 44B for pivotal movement between a stowed inoperative position (see FIGS. 2–4), through an orbit raising position at which the first and second thrust vectors of the electric thrusters 44A, 44B, respectively, are generally parallel to the yaw axis (see FIGS. 6–8), and to a north-south station keeping position at which the first and second thrust vectors are generally aligned with the center of mass 56 of the spacecraft (see FIGS. 9 and 10).

Figure 3:
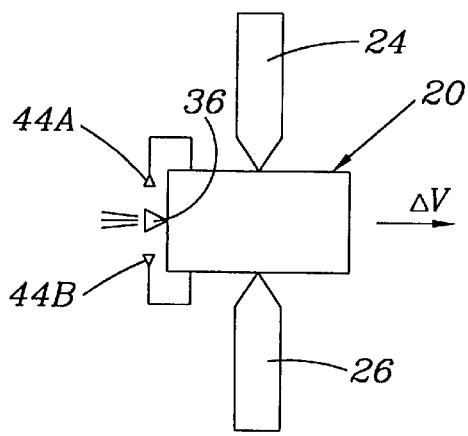
FIG. 3 is a side elevation view of the spacecraft and components illustrated in FIG. 2.
Figure 4:
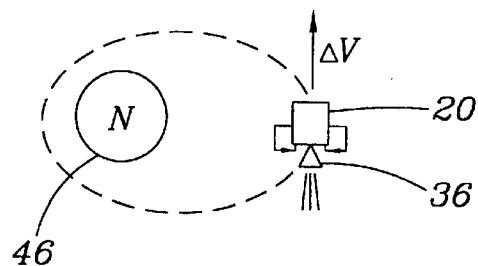
FIG. 4 is a diagrammatic plan view illustrating the spacecraft orbiting the earth during an orbit raising maneuver utilizing a chemical MST (main satellite thruster).
Figure 6:
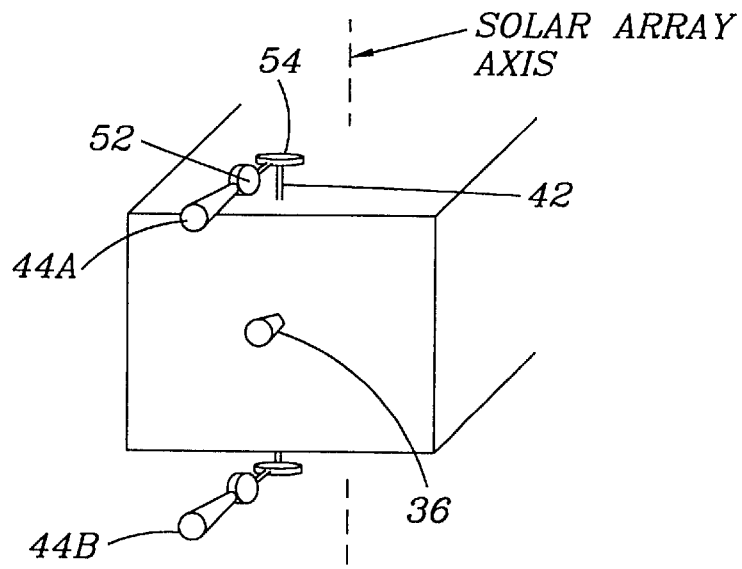
FIG. 6 is a diagrammatic perspective view of the spacecraft, similar to FIG. 2, but depicting the electric thrusters generally in their orbit raising position.

FIG. 2 illustrates the gimbaled electric thruster devices 22 in a stowed position. This is an advantageous position to place the thrusters while the spacecraft is in the launch vehicle fairing. Since space is limited in the fairing, stowing the thrusters in this manner effectively allows one to design a spacecraft with larger body dimensions than if the thrusters where not stowed. After the spacecraft 20 separates from the launch vehicle fairing the stowed position remains a safe position while the MST 36 fires as shown in FIG. 3 to initially increase the size of the spacecraft's orbit as shown in FIG. 4. Of course the thruster could be deployed in an electric orbit raising position, as shown in FIG. 6 and discussed below, prior to the MST firing if desired, or should the launch vehicle fairing size permit, the thruster device 22 could be stowed within the fairing in the electric orbit raising position eliminating the need for a deployment. Deployments are not limited to single continuous motor driven mechanisms, but could include combinations of coarse (staged) deployments and continuous motor driven mechanisms.

The use and advantages of the electric thruster devices 22 for electric orbit raising will now be described. As indicated in the previous paragraph, MST 36 is used to increase the size of the spacecraft's orbit following separation from the launch vehicle. However, use of the chemical MST is inefficient relative to electric thrusters. A primary use of this invention is to use electric thruster devices 22 to supplement the MST orbit raising. Preferably, the MST 36 is used to initially place the spacecraft at an altitude which will ensure that Van Allen radiation belts will not cause unacceptable degradation to the solar arrays (if such considerations are a concern for a given spacecraft). The remaining orbit raising (which includes in clination removal) from that pointed onward can be accomplished primarily through the use of electric thruster devices 22.

Figure 7:
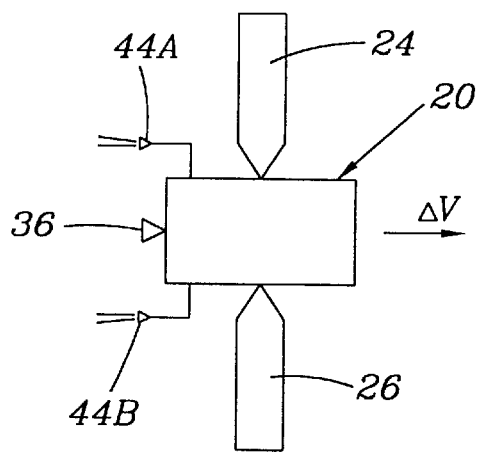
FIG. 7 is a side elevation view of the spacecraft, similar to FIG. 3, but depicting the electric thrusters generally in their orbit raising position.
Figure 8:
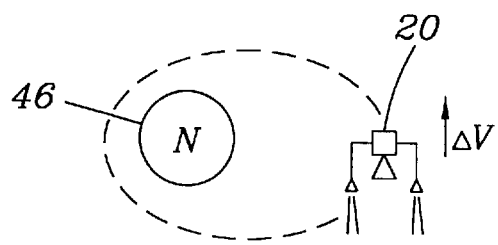
FIG. 8 is a diagrammatic perspective view of the spacecraft, similar to FIG. 4, but illustrating the spacecraft orbiting the earth during an orbit raising maneuver utilizing the electric thrusters.

Following the final MST burn, electric thrusters 44A, 44B are positioned in an electric orbit raising position as shown in FIG. 6. In the electric orbit raising position, thrusters 44A, 44B are generally parallel and directed along the yaw axis as shown in FIG. 7. Since the thrust is relatively small compared to the MST 36, it can take several weeks to reach a geosynchronous orbit. However, the reduced fuel mass results in a lighter separation mass and therefore substantially cheaper launch vehicle expense which can readily offset the time to orbit cost. During the duration of electric orbit raising, the electric thrusters are fired nearly continuously in the nominal positions shown in FIGS. 6–8. To steer the spacecraft it is preferable to use the momentum wheels 40 to orient the spacecraft attitude and hence electric thrust vector along the desired profile. Momentum wheels 40 preferably provide 3-axis actuation and momentum storage. Of course it is conceivable that by gimbaling the electric thrusters 44A, 44B and/or by differentially throttling them, the thruster device 22 could be used to assist in steering, or that the chemical thrusters 38 could be used to help steer.

In order to supply the electric thrusters 44A, 44B with continuous power, the solar arrays 24, 26 must be directed towards the sun. For orbits in the plane of the sun, this is readily accomplished by rotating the arrays about their axis to track the sun. For other orbits it may be necessary to rotate the spacecraft 20 about the yaw (or thrust) axis to keep the sun in the spacecraft's X-Z plane, from which the solar arrays can be slewed about their axes to track the sun.

Figure 11:
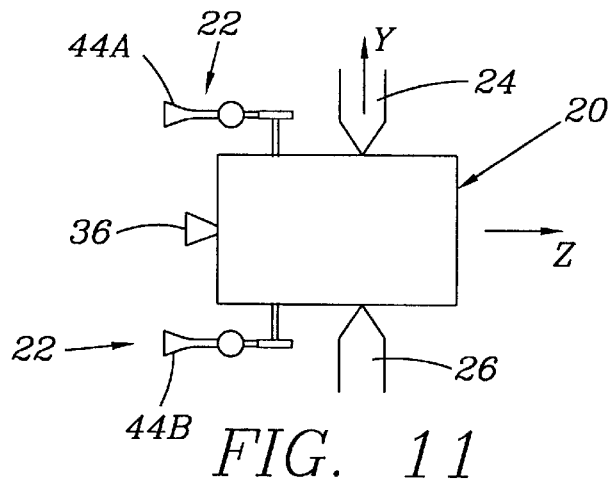
FIG. 11 and 12 are detail side elevation views illustrating, respectively, different orientations of the electric thrusters to achieve desired movements of the spacecraft.
Figure 12:
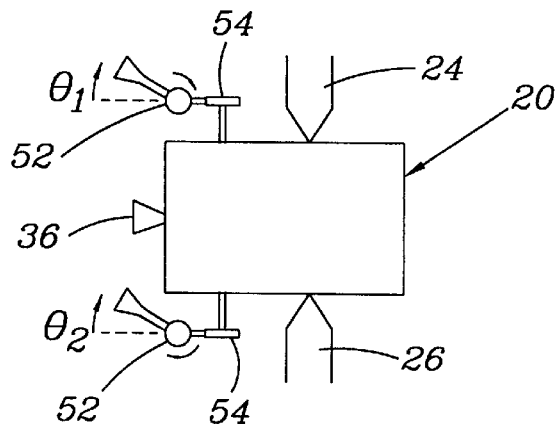
Figure 13:
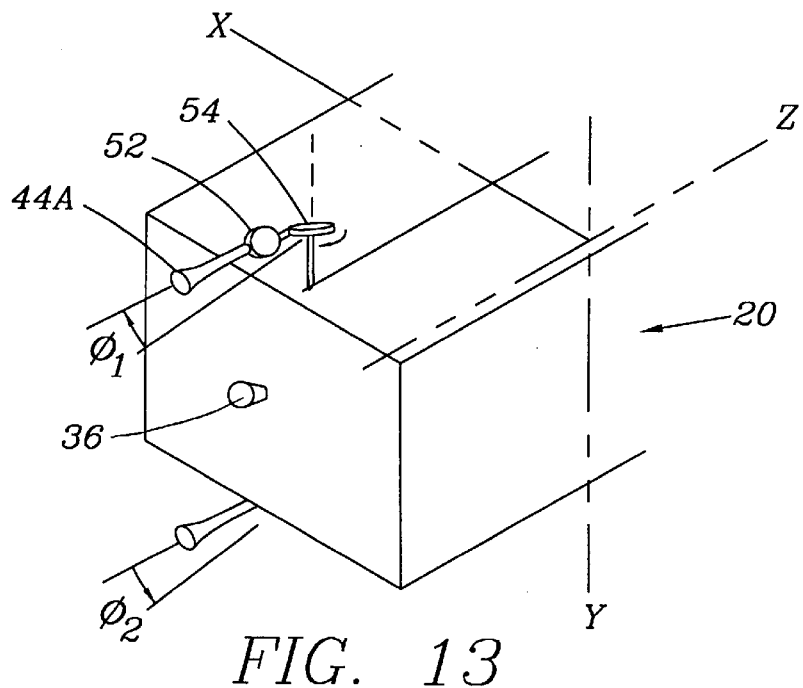
FIG. 13 is a detail perspective view, similar to FIGS. 2, 6, and 9 illustrating still a different orientation of the electric thrusters to achieve another desired movement of the spacecraft.

Although it is a primary objective to provide electric thrust along the yaw axis to reach an on-station orbit, the gimbal mechanism 50 can further be used to desaturate the momentum wheels 40 during electric orbit raising. As spacecraft 20 is steered during electric orbit raising attitude perturbations, such as those due to solar radiation pressure on the arrays 24, 26, are absorbed by the momentum wheels 40. FIG. 11 shows the nominal orbit raising position of the electric thruster devices 22. In this position, the net thrust vector is nominally aligned with the center of mass 56 of the spacecraft 20, and no torques are produced recognizing that the electric thrusters are equally spaced laterally from the center of mass and are both positioned parallel to the Z-axis. To unload momentum from the wheels 40, the thrust vectors are gimbaled slightly away from the nominal position to produce torques about each of three linearly independent axes. For example, displacements $\theta_1$ and $\theta_2$ in gimbals 52 of thrusters 44A and 44B respectively as shown in FIG. 12 can be used to create roll torques. For example, $\theta_1=\theta_2>0$ and $\theta_1=\theta_2<0$ give a positive and a negative roll torque, respectively. FIG. 13 shows displacements $\phi_1$ and $\phi_2$ residing in the X-Z plane, in the remaining gimbals 54 which can produce pitch and yaw torques. For example, $\phi_1=\phi_2>0$ and $\phi_1=\phi_2<0$ give a positive and negative pitch torque, respectively. $\phi_1=-\phi_2>0$ and $\phi_1=-\phi_2<0$ give positive and negative yaw torque, respectively. Thus it should be understood that momentum unloading can be fully achieved using the electric thrusters 44A, 44B.

Figure 17:
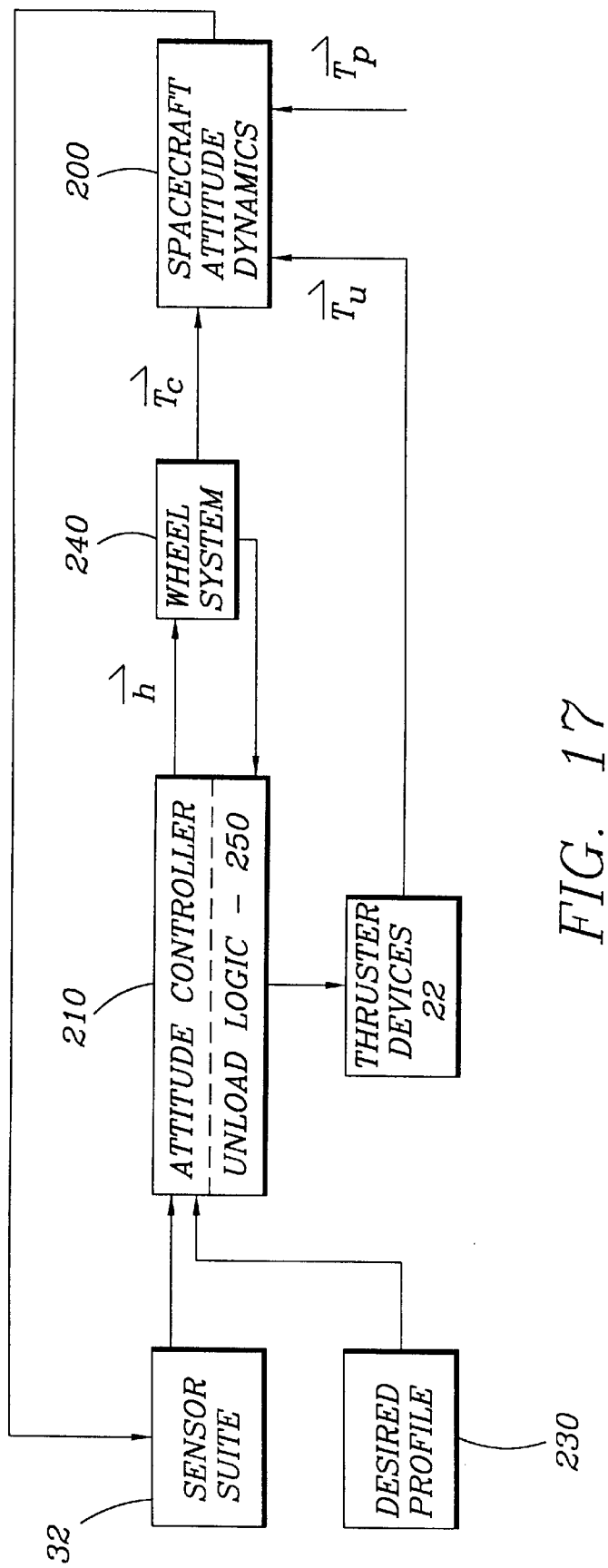
FIG. 17 is a schematic block diagram of a control system for operating the spacecraft during electric orbit raising.

FIG. 17 presents a control mode diagram for spacecraft attitude control during electric orbit raising. Spacecraft attitude dynamics 200 are affected by external perturbations $T_p$ (for example solar torques), wheel control torque $T_c$ and electric thruster unload torque $T_u$. Attitude controller 210 receives current attitude information (preferably three axis angular position and rates) from the onboard sensor suite 32. The controller compares the sensor input with the desired attitude profile 230. The desired profile comprises the three axis attitude information needed to orient the electric thrust vector and any rotation about the thrust vector needed to assist in positioning the solar array 24, 26. This information can be telemetered from the ground in blocks for temporary storage on board the spacecraft 20 prior to use. Upon comparison of the sensor information and the desired attitude profile, the controller 210 outputs momentum signals "h" to a wheel subsystem 240. The wheel subsystem 240 is conventional in design comprising wheel electronics, momentum wheels 40, and momentum wheel speed measurement capability. The wheel subsystem 240 produces the control torque $T_c$ responsible for ensuring that the spacecraft attitude dynamics 200 closely follows the desired profile 230. In addition, the wheel subsystem reports the wheel speeds to an unload logic module 250 in the controller 210. When wheel speeds reach threshold values, the unload logic module 250 gimbals the electric thrust of devices 22 away from the nominal orbit raising position to produce a desired torque $T_u$. The unload logic module 250 holds the thrusters 44A, 44B at the unload position until the wheels 40 are sufficiently desaturated at which point the electric thrusters are returned to the nominal no-torque orbit raising position (i.e., $T_u=0$).

Figure 5:
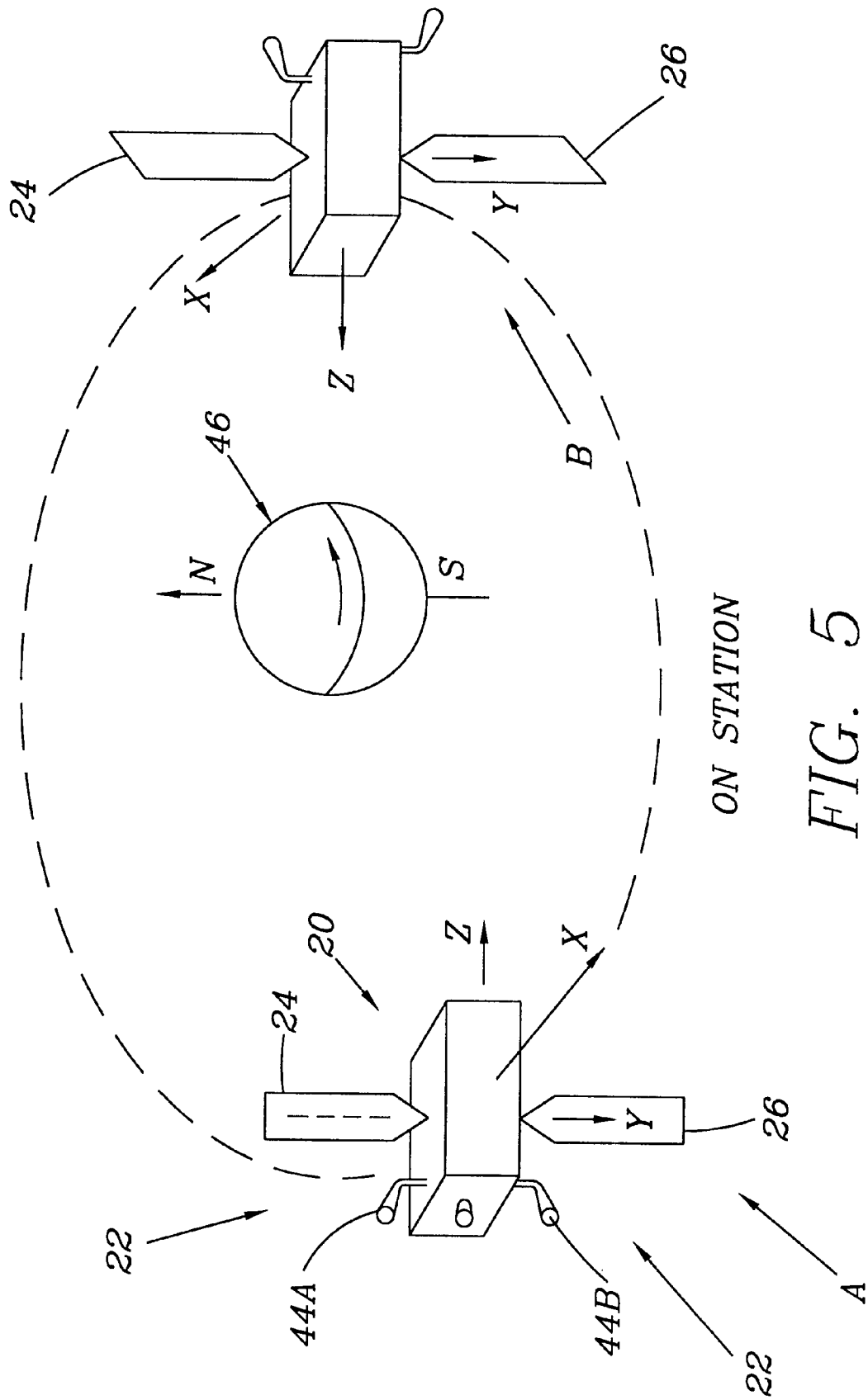
FIG. 5 is a diagrammatic perspective view illustrating the spacecraft in two positions A and B along its on-station orbit about the earth.

Once placed in synchronous orbit about the earth 46, spacecraft 20 is oriented as shown in FIG. 5, position A or B. As earlier noted, the z-axis is the yaw axis, X-axis is the roll axis, and the Y-axis is the pitch axis. On orbit, the electric thruster devices 22 can be used to perform north-south station keeping and assist in momentum management of wheels 40.

Figure 9:
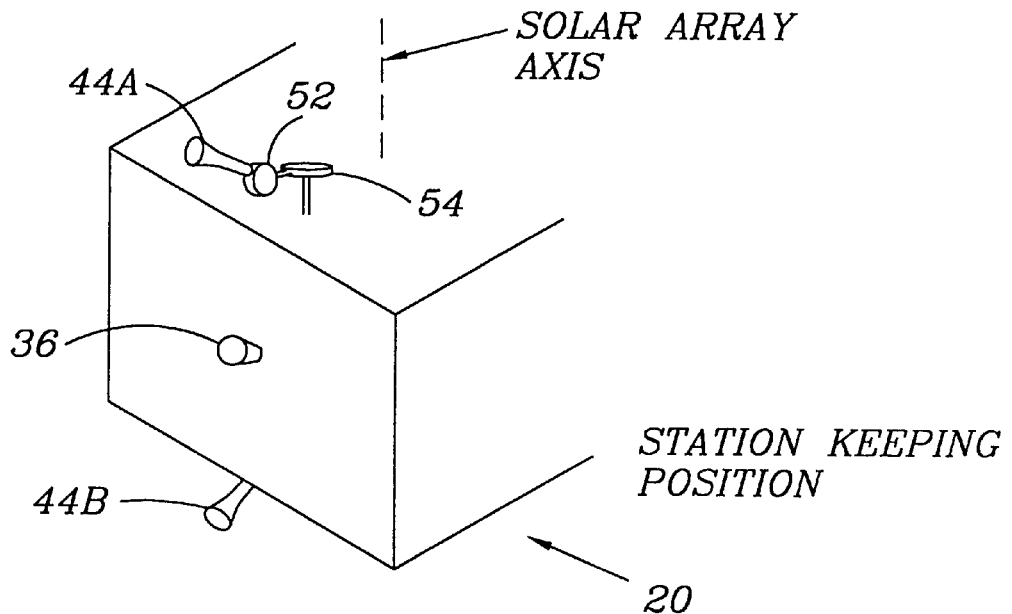
FIG. 9 is a diagrammatic perspective view of the spacecraft, similar to FIGS. 2 and 6, but depicting the electric thrusters generally in their north-south station keeping positions.
Figure 10:
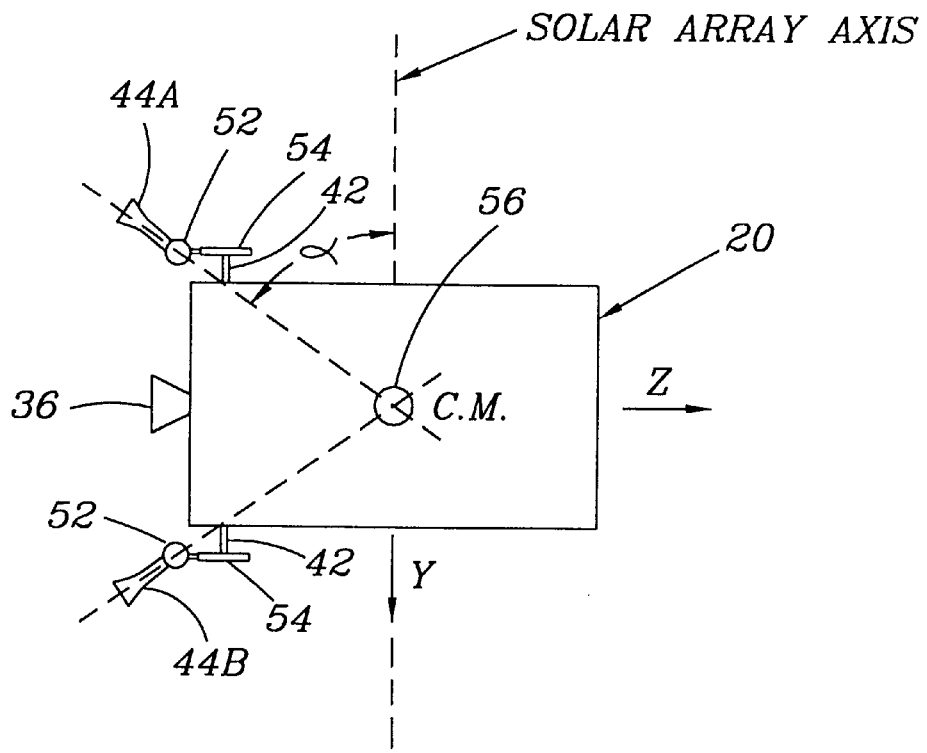
FIG. 10 is a side elevation view of the spacecraft, similar to FIGS. 3 and 7, but depicting the electric thrusters in their north-south station keeping positions.

FIGS. 9 and 10 depict electric thruster positioning for north-south station keeping on orbit. In the nominal station keeping position, the thrust vector of each electric thruster 44A, 44B is directed towards the center of mass 56 as indicated in FIG. 10. In this position the thrust of either thruster has a cant angle of $\alpha$ with respect to the north-south or pitch axis. As noted earlier for north-south station keeping it is desirable that cant angle $\alpha$ is relatively small so that much of the thrust produced is along the north-south axis. A major advantage of this invention over prior art, in particular over Anzel, is that the cant angle $\alpha$ can be made relatively small. By adjusting the length of pylon 42 the cant angle $\alpha$ is set: the longer the length, the smaller the angle $\alpha$. Placement of the thrusters as done in Anzel on the anti-earth deck 48 (see FIG. 1B) places severe constraints on the cant angle, yielding unacceptably large angles.

To perform a north-south station keeping maneuver with thruster devices 22 a single thruster 44A, or 44B is fired at a time. The strategy consists of firing one thruster near one orbital node and firing the second near the other node approximately twelve hours later. (An orbital node is a point on the orbit which crosses the equatorial plane of the earth.) This situation is depicted in FIG. 5: spacecraft 20 in position A fires thruster 44B creating a northward and radial burn. Twelve hours later spacecraft 20 is in position B and fires thruster 44A. creating a southward burn and a radial burn. As well understood in the art, the perturbations to orbital eccentricity caused by a radial thrust is canceled by firing thrusters in pairs at opposing sides of the orbit. If the thrust is small, as is with many electric thrusters, this twice daily procedure can be repeated on several subsequent days until the net adjustment to the orbital inclination is within suitable limits. A spacecraft operations team can readily define an appropriate station keeping program given specific spacecraft parameters including relative thrust levels, cant angles and spacecraft mass.

During operation of the electric thruster devices for north-south station keeping, an on board control system can slightly gimbal the thrust away from nominal station keeping position to simultaneously provide other services. For example a control loop can sense spacecraft rotations due to small misalignments of the thrust vector with the spacecraft center of mass and respond by gimballing the thruster more precisely through the center of mass. This is very helpful especially in light of the fact that the spacecraft center of mass shifts with the depletion of fuel mass as the mission progresses.

Figure 14:
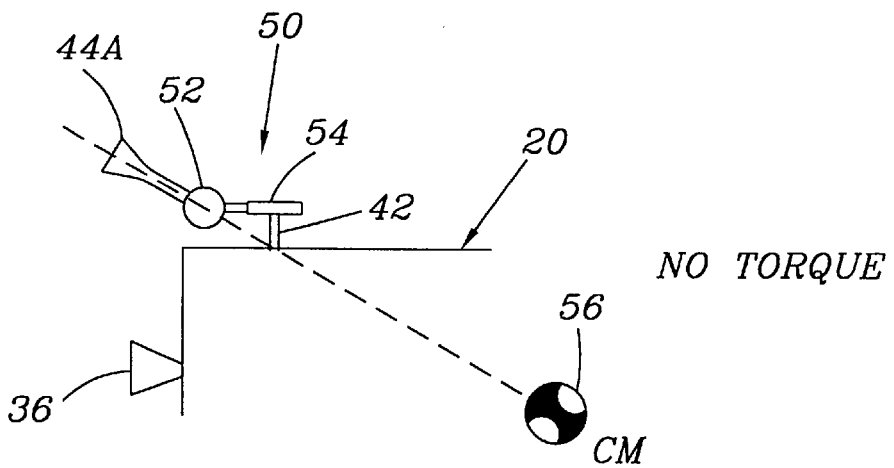
FIG. 14, 15, and 16 are detail side elevation views illustrating, respectively, various other different orientations of the electric thrusters to achieve still other desired movements of the spacecraft.
Figure 15:
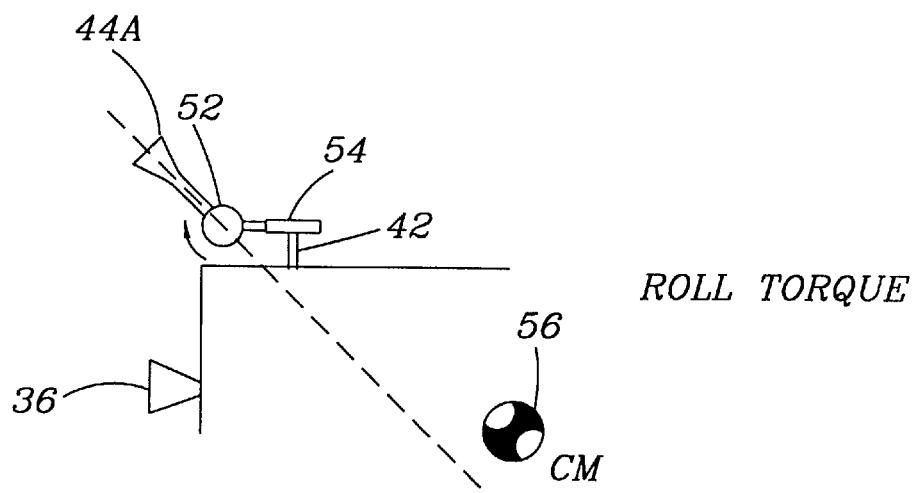

The electric thruster devices 22 are also useful for momentum wheel management especially during north-south station keeping maneuvers. FIG. 14 shows the nominal no-torque position of the electric thruster 44A during a southward burn. FIG. 15 shows that a small deviation from the nominal position about the gimbal 52 produces a roll torque. This torque can be used to unload momentum stored along the roll axis (or it could be used to provide roll torque to assist in repositioning the attitude of the spacecraft). For example, when roll momentum storage in wheels 40 reaches a threshold value, gimbal 52 is commanded to gimbal the thruster 44A to produce roll torque as shown in FIG. 15. The control system responds to the subsequent spacecraft attitude rotation by reducing the roll momentum storage in the wheels 40, simultaneously stabilizing the spacecraft attitude.

Figure 16:
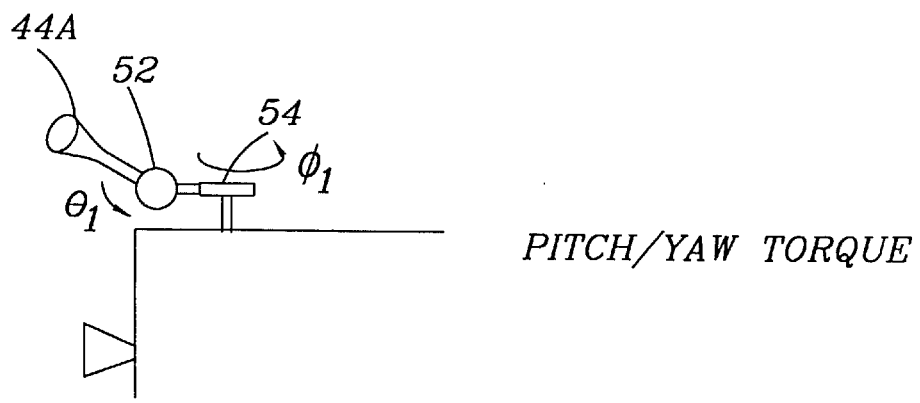

In FIG. 16, the remaining gimbal 54 (in combination with corrections to gimbal mechanism 52) can produce torque orthogonal to the roll axis about a pitch/yaw axis during a north-south station keeping maneuver. Depending upon the desired complexity of the controller, one could make use of the various momentum unloading capabilities of the gimbal mechanism 50. One design can use the gimbal mechanism 50 to unload roll only and use chemical thrusters to unload the other components when necessary. A more complicated and expensive design might incorporate the entire two-axis capability of the gimbal mechanism 50 to minimize the amount of chemical thrusters needed to unload the momentum wheels 40. Thus, it should be understood that roll momentum can be fully unloaded using either electric thruster 44A or 44B and that, in addition, some of the pitch and yaw momentum can be similarly unloaded.

Figure 18:
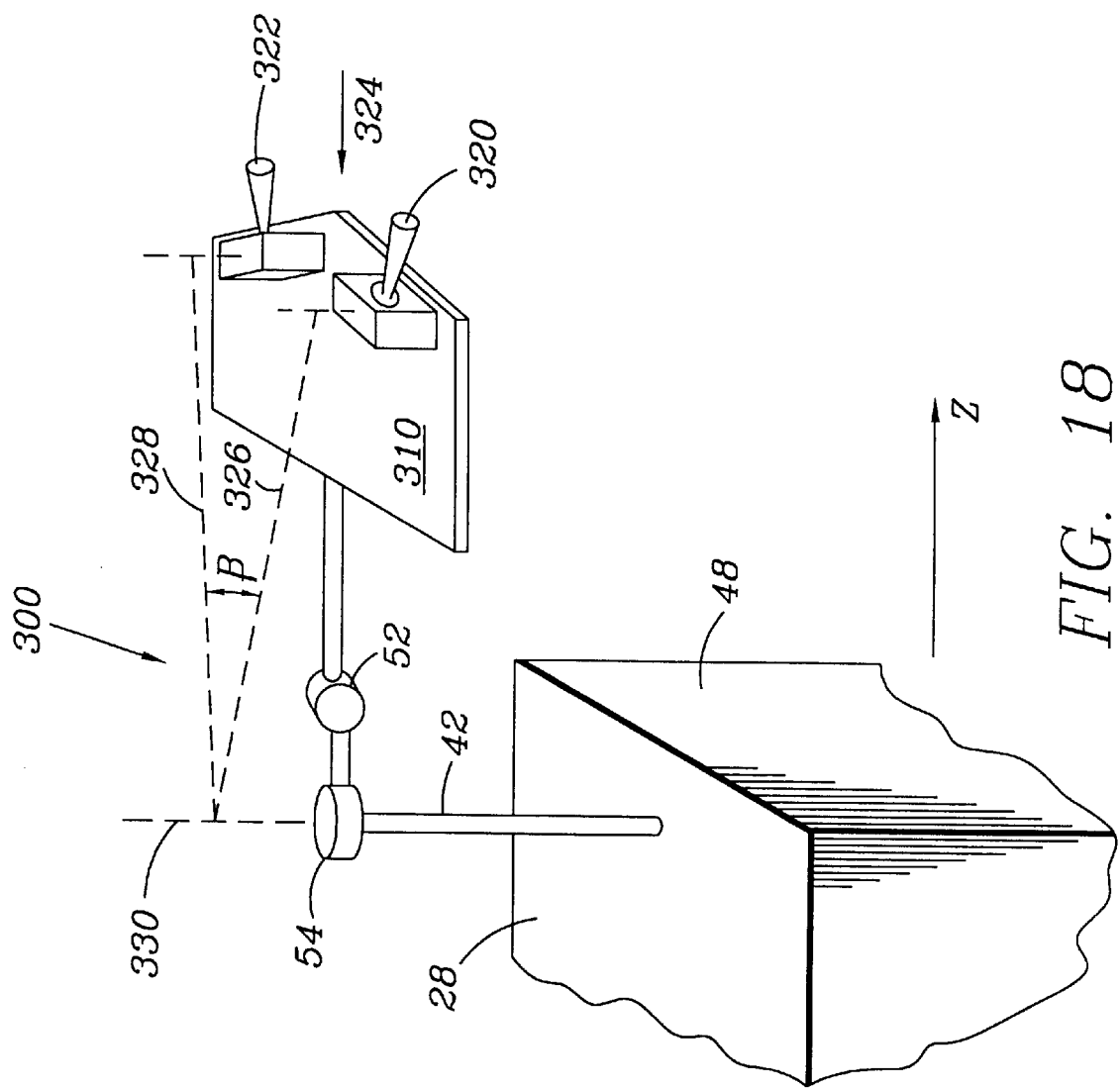
FIG. 18 is perspective view of an alternate embodiment of the electric thruster device having redundant thrusters and a radiator plate.

FIG. 18 shows an alternate embodiment of the invention depicting an electric thruster device 300 possessing especially advantageous features. Like electric thruster devices 22, electric thruster device 300 also has a pylon 42 extending from the north panel 28, and first and second gimbals 52, 54. Rather than a single thruster attached to gimbal 52, device 300 has a radiator panel 310 supporting two thrusters 320, 322. Two thrusters per device 300 allows for additional thrust during electric orbit raising. Note that thrusters 322 and 320 are clocked off of the z-axis at a small angle. The angle is chosen such that the thrust line 326, 328 of thrusters 320 and 322 respectively pass through the axis 330 of gimbal 54. The angle between lines 326 and 328 is a small angle β. The net thrust 324 is still along the Z-axis for electric orbit raising, but for north-south station keeping a single thruster 322 or 320 may be used by adding an angular offset to the gimbal 54 by angle ±β/2. In this way a single thruster, 322 for example, may be directed through the spacecraft 20 center of mass 56 and used for north-south station keeping. In this way, should thruster 322 fail the other thruster 320 may repositioned to thrust through the center of mass 56 and complete the remaining north-south station keeping maneuvers required for the mission. Of course a skilled artisan will readily recognize that three or more thrusters may be mounted on radiator plate 310 in a similar manner.

FIG. 18 illustrates other advantageous features. Radiator plate 310 is used to radiate heat generated by the thrusters into space preferably from both of its two surfaces. Direct sun light detracts from a radiator's capability. Since two thrusters per device 300 are firing during electric orbit raising it is essential that radiator 310 receives minimal sun light during these maneuvers in particular. This is readily accomplished by the design depicted in FIG. 18. During electric orbit raising, the spacecraft is oriented so that the solar arrays face the sun directly to produce power for maximal electric thrust. However, radiator 310 is parallel to the north panel 28 which is normal to the solar array axis. Hence, radiator 310 and north panel 28 view the sun edge on. Therefore there is minimal sun on the surface of the radiator and it can operate at full capacity.

A remaining feature illustrated in FIG. 18, and common to all embodiments of this invention, is the positioning of the thrusters 320, 322 or 44A, 44B and radiator 310 away from the spacecraft body. If the thrusters were positioned on the north or south panels 28, 30 or anti-earth deck 48 they would be reducing the space on these surfaces to mount other needed equipment. Thus, not only is space created by removing chemical thrusters (such as thrusters 2 in FIG. 1A) that are replaced by this invention, but also additional space is free because of the placement of the electric thruster devices.

While preferred embodiments of the invention have been disclosed in detail, it should be understood by those skilled in the art that various other modifications may be made to illustrate embodiments without departing from the scope of the invention as described in the specification and defined in the appended claims.

What is claimed is:

1. A system for performing at least one of a plurality of operations including orbit raising, north-south station keeping, and selective unloading of momentum wheels used for controlling the orientation of a three-axis stabilized spacecraft having roll, pitch, and yaw axes, and having a north face and a south face which when on station in orbit about the earth generally face north and south, respectively, said system comprising:

first and second thrusters having first and second thrust vectors, respectively;

first support means for mounting said first thruster adjacent said north face, said first thruster being positioned a spaced distance away from said north face in a first direction parallel to the pitch axis and a spaced distance away from the pitch axis in a second direction normal to the pitch axis;

second support means for mounting said second thruster adjacent said south face, said second thruster being positioned a spaced distance away from said south face in a third direction opposite the first direction and a spaced distance away from the pitch axis in the second direction; and gimbal means pivotally mounting said first and second thrusters on said first and second support means, respectively, for selectively positioning the thrust vectors of said first and second thrusters, said gimbal means including a gimbal system including:

a first gimbal for mounting said first thruster for pivotal movement about an axis parallel to the roll axis between a stowed inoperative position through an orbit raising position at which the first thrust vector is generally parallel to the yaw axis to a north-south station keeping position at which the first thrust vector is generally aligned with the center of mass of the spacecraft; and a second gimbal for mounting said second thruster for pivotal movement about an axis parallel to the roll axis between a stowed inoperative position through an orbit raising position at which the second thrust vector is generally parallel to the yaw axis to a north-south station keeping position at which the second thrust vector is generally aligned with the center of mass of the spacecraft.

2. A system as set forth in claim 1 wherein each of said first and second thrusters is an electric thruster.

3. A method of performing at least one of a plurality of operations of a three-axis stabilized spacecraft having roll, pitch, and yaw axes, and having a north face and south face which when on station in orbit generally face north and south, respectively, said method comprising the steps of:
 (a) pivotally mounting on a first support means a first thruster adjacent the north face of the spacecraft such that it is positioned a spaced distance away from the spacecraft in a first direction parallel to the pitch axis and a spaced distance away from the pitch axis in a second direction normal to the pitch axis and for pivotal movement about an axis parallel to the roll axis between a stowed inoperative position through an orbit raising position at which the first thrust vector is generally parallel to the yaw axis to a north-south station keeping position at which the first thrust vector is generally aligned with the center of mass of the spacecraft;
 (b) pivotally mounting a second thruster on a second support means adjacent the south face of the spacecraft such that it is positioned a spaced distance away from the south face in a third direction opposite the first direction and a spaced distance away from the pitch axis in the second direction and for pivotal movement about an axis parallel to the roll axis between a stowed inoperative position through an orbit raising position at which the second thrust vector is generally parallel to the yaw axis to a north-south station keeping position at which the second thrust vector is generally aligned with the center of mass of the spacecraft; and
 (c) selectively positioning the direction of the first and second thrusters on said first and second support means, respectively, for performing an operation.

4. A method as set forth in claim 3 wherein step (c) includes the steps of:
 (d) aligning the first and second thrusters, respectively, so as to be generally parallel to the yaw axis;
 (e) positioning the spacecraft to thereby generally align the yaw axis in the direction of desired thrust of the spacecraft as it orbits the earth;
 (f) simultaneously operating the first and second thrusters to achieve a desired new orbit.

5. A method as set forth in claim 3 wherein step (c) includes the steps of:
 (d) positioning the spacecraft to thereby generally align the yaw axis with the center of the earth and the roll axis with the orbit speed of the spacecraft as it orbits the earth;
 (e) aligning the first and second thrusters, respectively, so as to be generally directed through the center of mass of the spacecraft;
 (f) operating the first thruster at a predetermined location in the orbit of the spacecraft;
 (g) operating the second thruster at a location in the orbit of the spacecraft spaced approximately 180° around the orbit from the predetermined location;
 to thereby achieve north-south station keeping of the spacecraft.

6. A method as set forth in claim 5 wherein the three-axis stabilized spacecraft includes a plurality of momentum wheels operable for storing angular momentum and stabilizing the attitude of the spacecraft; and
 wherein step (g) further includes:
  reducing the stored angular momentum of the momentum wheels by aligning the second thruster such that its thrust vector does not pass through the center of mass of the spacecraft.

7. A method as set forth in claim 3 wherein the three-axis stabilized spacecraft includes momentum wheels for controlling the orientation thereof, and
 wherein the plurality of operations includes at least one of the following steps of:
  (d) thrusting along the yaw axis to assist in reaching a geosynchronous orbit;
  (e) reducing the stored angular momentum of the momentum wheels; and
  (f) north-south stationkeeping of the spacecraft.

8. A thruster device attached to a spacecraft having a north face which when on station in orbit about the earth said north face generally faces north and a south face which when on station in orbit about the earth, said south face generally faces south, said thruster device comprising:
 a thruster having a thrust vector;
 a thermal radiator having a generally planar surface attached to and having thermal contact with said thruster, the thrust vector of said thruster being generally parallel to the planar surface of said thermal radiator;
 a support means for mounting said thruster and said thermal radiator adjacent said north face, said thruster and said radiator being positioned a spaced distance in a direction normal to the north face and a spaced distance in a direction tangential to the north face away from the geometric center of the north face; and
 gimbal means pivotally mounting said thruster and said thermal radiator on said support means for selectively positioning the thrust vector of said thruster.

9. A device as set forth in claim 8 wherein said generally planar surface of said thermal radiator is generally parallel to one of said north face and said south face.

10. A device as set forth in claim 8 wherein the thrust vector of said thruster is generally directed through the center of mass of said spacecraft.

11. A device as set forth in claim 8 further comprising:
 a second thruster attached to and having thermal contact with said planar surface of said thermal radiator, said second thruster having a second thrust vector.

12. A device as set forth in claim 11 wherein the second thrust vector of the second thruster is directed through the center of mass of said spacecraft.

13. A device as set forth in claim 11 wherein the sum of the first and second thrust vectors lies generally in a plane parallel to one of said north face and said south face of said spacecraft.

14. A thruster device attached to a spacecraft having a south face which when on station in orbit about the earth said south face generally faces south, said thruster device comprising:
 a thruster having a thrust vector;

a thermal radiator having a generally planar surface attached to and having thermal contact with said thruster, the thrust vector of said thruster being generally parallel to the planar surface of said thermal radiator;

a support means for mounting said thruster and said thermal radiator adjacent the south face, said thruster and said thermal radiator being positioned a spaced distance in a direction normal to the south face and a spaced distance in a direction tangential to the south face away from the geometric center of the south face; and gimbal means pivotally mounting said thruster and said thermal radiator on said support means for selectively positioning the thrust vector of said thruster.

15. A system for performing at least one operation of a three-axis stabilized spacecraft having roll, pitch, and yaw axes, and having a north face and a south face which when on station in orbit about the earth generally face north and south, respectively, said system comprising:

first and second thrusters having first and second thrust vectors, respectively;

first support means for mounting said first thruster adjacent said north face, said first thruster being positioned a spaced distance away from said north face in a first direction parallel to the pitch axis and a spaced distance away from the pitch axis in a second direction normal to the pitch axis;

second support means for mounting said second thruster adjacent said south face, said second thruster being positioned a spaced distance away from said south face in a third direction opposite the first direction and a spaced distance away from the pitch axis in the second direction; and gimbal means pivotally mounting said first and second thrusters on said first and second support means, respectively, for selectively positioning the thrust vectors of said first and second thrusters, said gimbal means including:

a first gimbal for mounting each of said first and second thrusters for pivotal movement about an axis parallel to the roll axis between a stowed inoperative position to a position at which the first and second thrust vectors are directed away from the pitch axis.

16. A system for performing at least one of a plurality of operations including orbit raising, north-south station keeping, and selective unloading of momentum wheels used for controlling the orientation of a three-axis stabilized spacecraft having roll, pitch, and yaw axes, and having a north face and a south face which when on station in orbit about the earth generally face north and south, respectively, said system comprising:

first and second thrusters having first and second thrust vectors, respectively;

first support means for mounting said first thruster adjacent said north face, said first thruster being positioned a spaced distance away from said north face in a first direction parallel to the pitch axis and a spaced distance away from the pitch axis in a second direction normal to the pitch axis;

second support means for mounting said second thruster adjacent said south face, said second thruster being positioned a spaced distance away from said south face in a third direction opposite the first direction and a spaced distance away from the pitch axis in the second direction; and gimbal means pivotally mounting said first and second thrusters on said first and second support means, respectively, for selectively postioning the thrust vectors of said first and second thrusters, said gimbal means including a gimbal system including:

a first gimbal for mounting said first thruster for thruste for pivotal movement about an axis parallel to the roll axis between a stowed inoperative position to a position at which the first thrust vector is directed such that it does not pass through the center of mass; and a second gimbal for mounting said second thruster for pivotal movement about an axis parallel to the roll axis bewteen a stowed inoperative position to a position at which the second thrust vector is directed such that it does not pass through the center of mass.

17. A system as set forth in claim 16 wherein each of said first and second thrusters is an electric thruster.

18. A method of performing at least one of a plurality of operations of a three-axis stabilized spacecraft having roll, pitch, and yaw axis, and having a north face and south face which when on station in orbit generally face north and south, respectively, said method comprising the steps of:

(a) pivotally mounting on a first support means a first thruster adjacent the north face of the spacecraft such that it is positioned a spaced distance away from the spacecraft in a first direction parallel to the pitch axis and a spaced distance away from the pitch axis in a second direction normal to the pitch axis and for pivotal movement about an axis parallel to the roll axis bewteen a stowed inoperative position to a position at which the first thrust vector is directed such that it does not pass through the center of mass;

(b) pivotally mounting a second thruster on a second support means adjacent the south face of the spacecraft such that it is positioned a spaced distance away from the south face in a third direction opposite the first direction and a spaced distance away from the pitch axis in the second direction and for pivotal movement about an axis parallel to the roll axis bewteen a stowed inoperative position to a position at which the second thrust vector is directed such that it does not pass through the center of mass; and (c) selectively postioning the direction of the first and second thrusters on said first and second support means, respectively, for performing an operation.

19. A method as set forth in claim 18 including the step of:

(d) directing at least one of the first and second thrusters so as to produce a torque about the center of mass of the spacecraft.

20. A method as set forth in claim 19 wherein the three-axis stabilized spacecraft includes a plurality of momentum wheels operable for storing angular momentum and stabilizing the attitude of the spacecraft; and including the step of:

(e) reducing the stored angular momentum of the momentum wheels by aligning at least one of the first and second thrusters such that its thrust vector does not pass through the center of mass of the spacecraft.

21. A method as set forth in claim 20 wherein step (e) includes the step:

(f) reducing primarily the component of angular momentum stored by the momentum wheels along the roll axis of the spacecraft.

22. A method as set forth in claim 18 including the step of:
   (d) directing at least one of the first and second thrust vectors generally through the center of mass of the spacecraft.

23. A method as set forth in claim 18 including the step of:
   (d) directing at least one of the first and second thrusters such that its thrust vector does not pass through the pitch axis of the spacecraft.

24. A method as set forth in claim 18
   wherein the three-axis stabilized spacecraft includes a plurality of momentum wheels for storing angular momentum and stabilizing the attitude of the spacecraft; and
   including the step of:
      (g) reducing the stored angular momentum of the momentum wheels by aligning at least one of the first and second thrusters such that its thrust vector is not parallel to the yaw axis.

25. A method as set forth in claim 24 including the step of:
   (h) reducing the stored angular momentum of the momentum wheels about each of three orthogonal axes.

26. A method as set forth in claim 18
   wherein the three-axis stabilized spacecraft includes a plurality of momentum wheels operable for storing angular momentum and stabilizing the attitude of the spacecraft; and
   including the step of:
      (d) reducing the stored angular momentum of the momentum wheels by aligning the first thruster such that its thrust vector does not pass through the center of mass of the spacecraft.

* * * * *